United States Patent [19]

Kinoshita et al.

[11] Patent Number: 4,478,191
[45] Date of Patent: Oct. 23, 1984

[54] AIR-FUEL RATIO CONTROL SYSTEM FOR INTERNAL COMBUSTION ENGINES

[75] Inventors: Kenzi Kinoshita; Yukihide Niimi, both of Kariya; Masahiro Urushidani, Toyota, all of Japan

[73] Assignees: Nippondenso Co., Ltd., Kariya; Toyota Jidosha Kabushiki Kaisha, Toyota, both of Japan

[21] Appl. No.: 459,140

[22] Filed: Jan. 19, 1983

[30] Foreign Application Priority Data

Jan. 19, 1982 [JP] Japan .................................. 57-6236

[51] Int. Cl.³ ............................................. F02M 51/00
[52] U.S. Cl. ..................................... 123/489; 123/589
[58] Field of Search ................ 123/489, 589, 587, 480

[56] References Cited

U.S. PATENT DOCUMENTS

| 3,895,611 | 7/1975 | Endo et al. | |
| 4,084,563 | 4/1978 | Hattori et al. | 123/589 |
| 4,143,623 | 3/1979 | Norimatsu et al. | |
| 4,229,105 | 12/1980 | Ito et al. | 123/589 |
| 4,252,098 | 2/1981 | Tomczak et al. | 123/489 |
| 4,359,029 | 11/1982 | Furuhashi et al. | 123/489 |
| 4,392,471 | 7/1983 | Miyagi et al. | 123/489 |
| 4,399,792 | 8/1983 | Otsuka et al. | 123/489 |

FOREIGN PATENT DOCUMENTS 146246 11/1980 Japan .................................. 123/480

*Primary Examiner*—Parshotam S. Lall
*Attorney, Agent, or Firm*—Cushman, Darby & Cushman

[57] ABSTRACT

In an air-fuel ratio control system for internal combustion engines, an electronic control unit supplies a drive signal to an air-fuel ratio actuator in response to signals from an oxygen sensor and a heavy load sensor. The electronic control unit holds the air-fuel ratio compensation signal to a predetermined value when the heavy load sensor detects that a predetermined time has not passed since the engine enters a heavy load condition, and changes the air fuel ratio compensation signal to a predetermined value associated with the rich mixture when it is detected that the predetermined time has passed.

4 Claims, 6 Drawing Figures

AIR-FUEL RATIO CONTROL SYSTEM FOR INTERNAL COMBUSTION ENGINES

BACKGROUND OF THE INVENTION

The present invention relates to a system for feedback control of the air-fuel ratio in response to a signal from an oxygen sensor, or more in particular to a system for suspending the feedback control at the time of the heavy load of the engine.

Conventional vehicle engines comprise an oxygen sensor in the exhaust system for detecting the air-fuel ratio from the oxygen concentration so that the air-fuel ratio is subjected to feedback control by the detection signal of the oxygen sensor. The disadvantage of this system is that the feedback control under heavy engine load results in an excessively lean mixture, thus deteriorating the operating performance. If the feedback control is suspended immediately after reaching the heavy load condition, the operating performance would be improved. The problem, however, is that the enriched mixture increases the amount of HC and CO exhausts.

SUMMARY OF THE INVENTION

The object of the present invention is to obviate the above-mentioned problems, or specifically to provide an air-fuel ratio control system in which immediately after the engine reaches a heavy load condition, the air-fuel compensation amount controlled by the output signal of the oxygen sensor is held, and after a predetermined period of time, the air-fuel ratio compensation amount is changed to a predetermined value associated with a rich condition regardless of the signal from the oxygen sensor, thus taking measures against a deteriorated operating performance and an increased CO and HC discharge amount.

DESCRIPTION OF THE PREFERRED EMBODIMENTS

Figure 1:
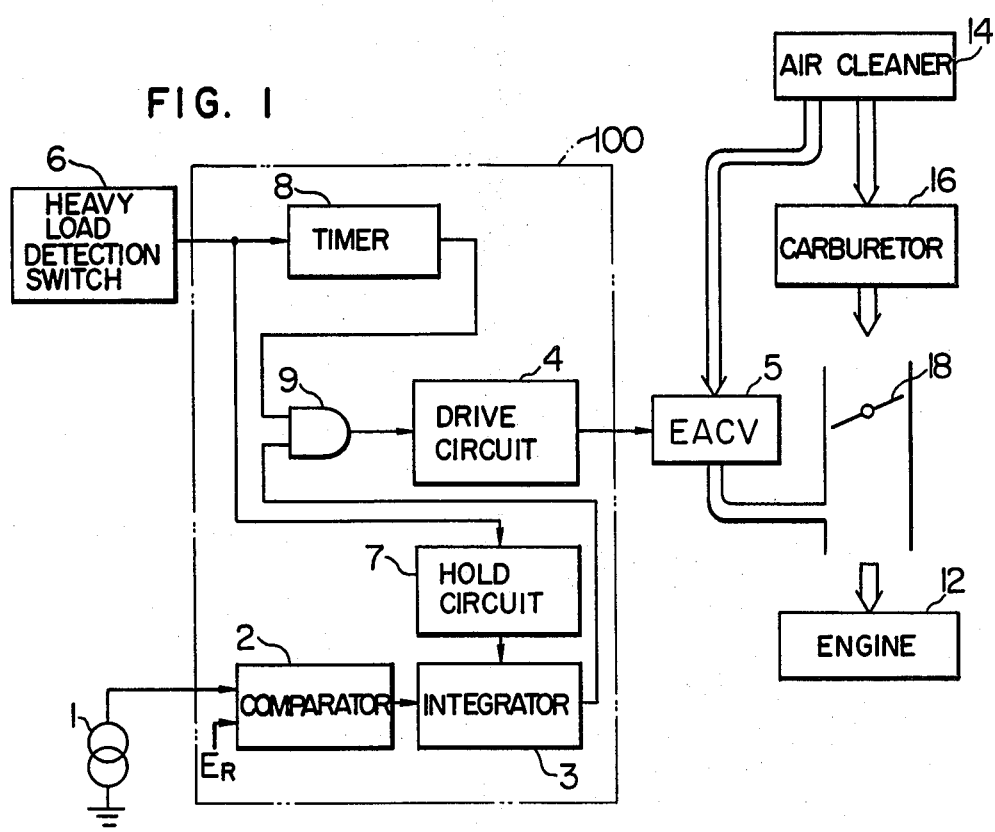
FIG. 1 is a block diagram showing a first embodiment of the control system according to the present invention.

An embodiment of the present invention will be described with reference to the accompanying drawings below. FIG. 1 is a block diagram showing the construction of the system according to the present invention. Reference numeral 1 designates an oxygen sensor for detecting the oxygen concentration in the exhaust gas of an internal combustion engine 12. Numeral 2 designates a comparator circuit for comparing the detection signal from the oxygen sensor 1 with a reference voltage $E_R$ and producing an inverted comparison signal and a non-inverted comparison signal when the detection signal is larger than the reference voltage. Numeral 3 designates an air-fuel ratio compensation amount computing circuit (integrater circuit) for producing an air-fuel ratio compensation amount signal (AFC signal) depending on the concentration of the mixture in response to the inverted comparison signal and the non-inverted comparison signal of the comparator circuit 2. Numeral 4 designates a drive circuit for producing a drive signal in response to the AFC signal from the integrator circuit 3. Numeral 5 designates an air-fuel ratio control actuator (EACV) for controlling the air-fuel ratio of the mixture in response to the drive signal from the drive circuit 4. EACV 5 is a valve of linear solenoid type for controlling the air flow rate and regulates the air-fuel ratio of the mixture by adjusting the auxiliary air flow supplied bypassing a carburetor 16 and a throttle valve 18.

An oxygen sensor 11 is provided in the exhaust pipe of the engine for detecting the air-fuel ratio from the oxygen concentration of the exhaust gas, and is of a well-known zirconia or titanium type.

An automotive engine 12 is of a well-known spark ignition type, in which the combustion air is sucked through an air cleaner 14, the carburetor 16, the throttle valve 18, and the fuel is mixed with the air in the carburetor 16 thereby to introduce an airfuel mixture. Numeral 6 designates a heavy load detection switch for detecting a heavy load condition of the engine and adapted to open for producing a detection signal under a heavy engine load condition. Numeral 7 designates an air-fuel ratio compensation amount hold circuit ($V_F$ hold circuit) for producing a hold signal to maintain the compensation amount output of the integrator circuit 3 constant regardless of the concentration of the mixture in response to the detection signal of the heavy load detection switch 6. Numeral 8 designates a timer circuit triggered by the detection signal of the heavy load detector 6 for producing a predetermined timing signal. The timer circuit 8 produces a "1" level signal as shown in FIG. 3(b) when the heavy load detector 6 is turned on and further continues producing the "1" level signal during the time interval $t_1$ from the time when the detector 6 is turned on to off. The timer circuit 8 produces a "0" level signal during the time interval from the lapse of time $t_1$ to the time when the detector 6 is turned off to on. Numeral 9 designates a gate circuit for supplying the air-fuel ratio control means 5 with an AFC signal of the integrator circuit 3 through the drive circuit 4 for a time period corresponding to the timing signal of the timer circuit 8. The comparator circuit 2, the integrator circuit 3, the drive circuit 4, the hold circuit 7, the timer circuit 8 and the gate circuit 9 make up an electronic control unit 100.

Figure 2:
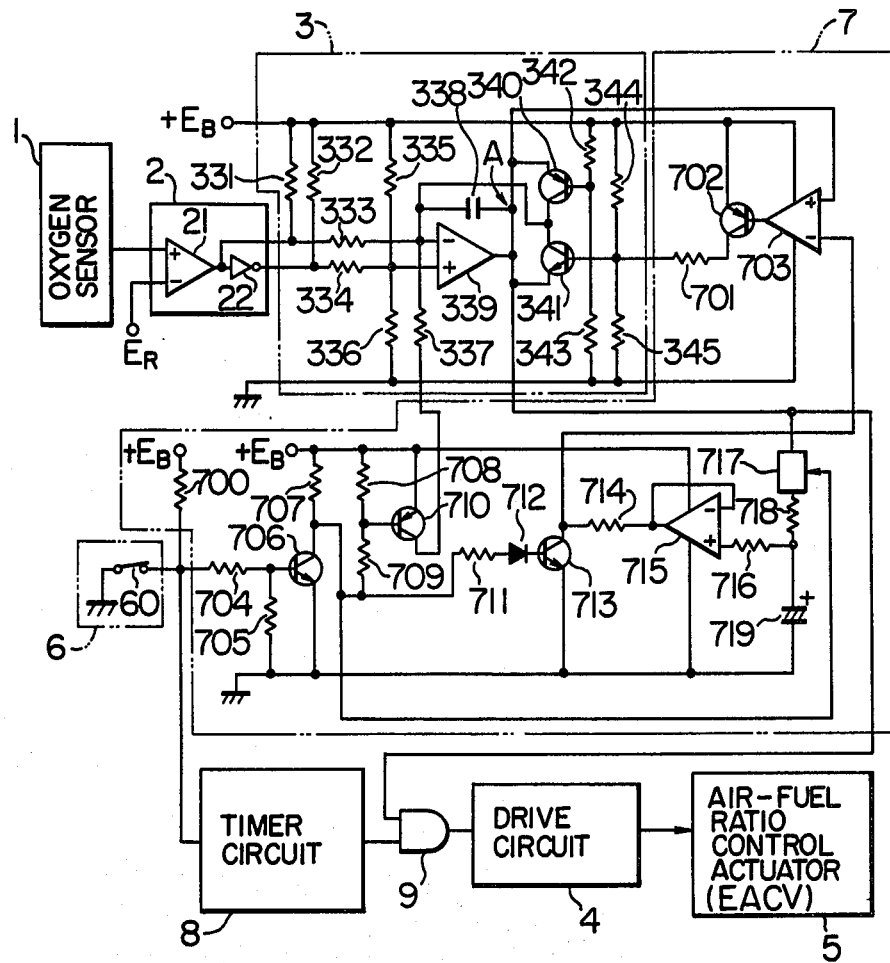
FIG. 2 is a diagram showing electrical circuits of the main blocks in FIG. 1.

FIG. 2 shows the electrical circuits of the essential parts of the block diagram of FIG. 1. Numeral 21 designates a comparator of the comparator circuit 2, in which the non-inverting input thereof is supplied with the detection signal of the oxygen sensor 1 and the inverting input thereof is supplied with the reference voltage $E_R$. Numeral 22 designates an inverter for inverting the comparison output of the comparator 21. The comparator circuit 2 produces the non-inverted comparison signal of the comparator 21 and the inverted comparison signal of the inverter 22. In the integrator circuit 3, numerals 331 and 332 designate pull-up resistors for the operational amplifier 339. The resistors 331 and 333 and the capacitor 338 determine the integration constant of the integrator circuit 3, while the resistors 332, 334, 335 and 336 determine the skip value.

Numeral 340 designates a transistor, and numerals 342 and 343 resistors for determining the base bias of the transistor 340. Numeral 341 designates a transistor, and numerals 344 and 345 resistors for determining the base bias of the transistor 341. The transistor 340, the resistors 342 and 343 determine the upper limit of the air-fuel ratio compensation amount $V_F$, while the transistor 341, the resistors 344 and 345 define the lower limit of the air-fuel ratio compensation amount $V_F$. In the integration voltage hold circuit 7, the resistor 701 and the transistor 702 are for turning on the transistor 341 only when the output of the operational amplifier 703 is at 0 level. The operational amplifier 703 is for comparing the value $V_F$ with the $V_F$ memory value. The resistors 700, 704, 705 and 707 are set in such a manner that the transistor 706 conducts when the detection switch 60 of the heavy load detector 6 opens. The resistors 708, 709, 337 and the transistor 710 are operated by the conduction of the transistor 706 thereby to reduce the air-fuel ratio compensation output $V_F$ to the $V_F$ memory value of the integrator circuit 3 rapidly at the end of the engine heavy load condition. The resistor 711, the diode 712 and the transistor 713 apply the $V_F$ memory value to the inverting input of the operational amplifier 703 under heavy load. The resistor 714 limits the output current of the operational amplifier 715 when the transistor 713 conducts. The operational amplifier 715 functions as a buffer circuit and the non-inverting input thereof is connected with the resistor 716. The $V_F$ memory value is determined by the time constant due to the resistor 718 and the capacitor 719. Numeral 717 designates an analog switch, which opens by the conduction of the transistor 706 thereby to hold the $V_F$ memory value.

The operation of the control system according to the present invention will be explained mainly with reference to the integration voltage hold circuit 7.

Under normal operating conditions, the heavy load detection switch 60 is closed and the transistor 706 is cut off. Therefore, the transistor 713 is turned on and the analog switch 717 is closed. Since the transistor 713 is turned on, the minus input of the operational amplifier 715 is "low", so that the transistor 702 is not turned on.

Also, since the analog switch 717 is closed, the average value of $V_F$ changing under rich and lean conditions is always stored at the time constant of the resistor 718 and the capacitor 719.

Figure 3:
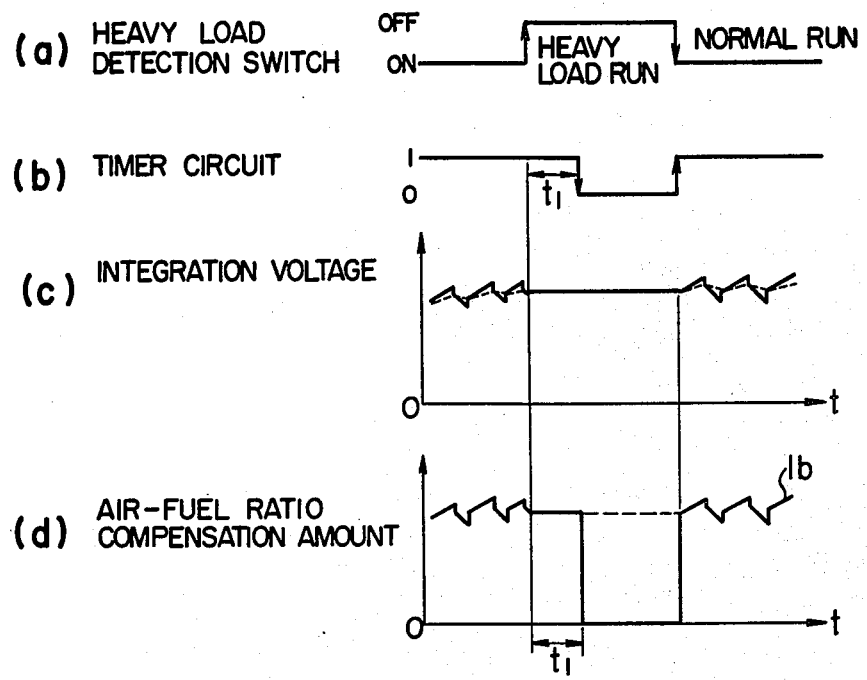
FIG. 3 shows the relation of the detection signal of a heavy load detection switch with an integration voltage and an air-fuel ratio compensation amount.

With the increase of load, the heavy load detection switch 60 changes from closed to open state as shown in the waveform (a) of FIG. 3, thus turning on the transistor 706. At the same time, the transistor 710 is turned on, the transistor 713 is turned off, and the analog switch 717 is opened. The turning on of the transistor 710 causes the current to be supplied rapidly. With the turning off of the transistor 713, on the other hand, the average memory value $V_F$ is applied to the minus input of the operational amplifier 715. Since the analog switch 717 is opened, the average memory value $V_F$ is held.

The operational amplifier 703 compares $V_F$ with the average memory value of $V_F$, and when the average memory value of $V_F$ slightly exceeds $V_F$, produces a "low" output, so that the transistor 702 is turned on thereby to turn on the transistor 341. With the turning on of the transistor 341, the voltage at point A, namely, the value $V_F$ increases, and when the value $V_F$ exceeds the average memory value $V_F$ held, the output of the operational amplifier 703 is raised to "high", thereby turning off the transistor 702 and the transistor 341. This causes the voltage at point A to be reduced.

This process is repeated. That is, the value $V_F$ is repeatedly compared with the $V_F$ average memory value held and the transistor 341 is repeatedly turned on and off, with the result that the value $V_F$ is settled at the average memory value of $V_F$ held.

Thus, the value $V_F$ is held as shown in the outer portion of the waveform (c) of FIG. 3. It is noted that the value $V_F$ held acts as an air-fuel ratio compensation amount during the time interval $t_1$ when the timer circuit 8 is operating, and after the lapse of the time interval $t_1$ the application of the value $V_F$ through the driving circuit 4 is inhibited by the AND circuit 9, and then the air-fuel ratio compensation amount becomes zero and EACV 5 is fully closed and an additional air is not supplied to make rich the air-fuel ratio of the mixture.

When the operation returns normal again, the transistors 341 and 710 are turned off, so that integration starts at the $V_F$ average memory value before the heavy load operation, thus leading to the integration waveform as shown in FIG. 3.

Figure 6:
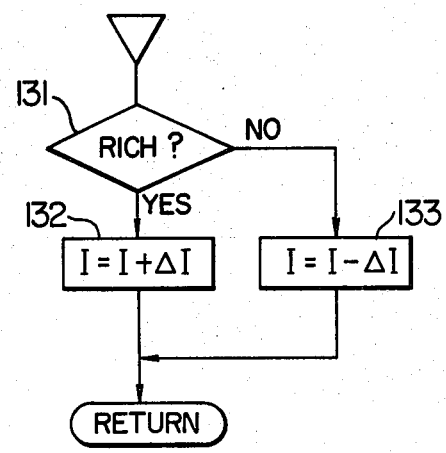
FIG. 6 is a flowchart showing the timer interruption routine for interruption in the main routine of FIG. 5.
Figure 4:
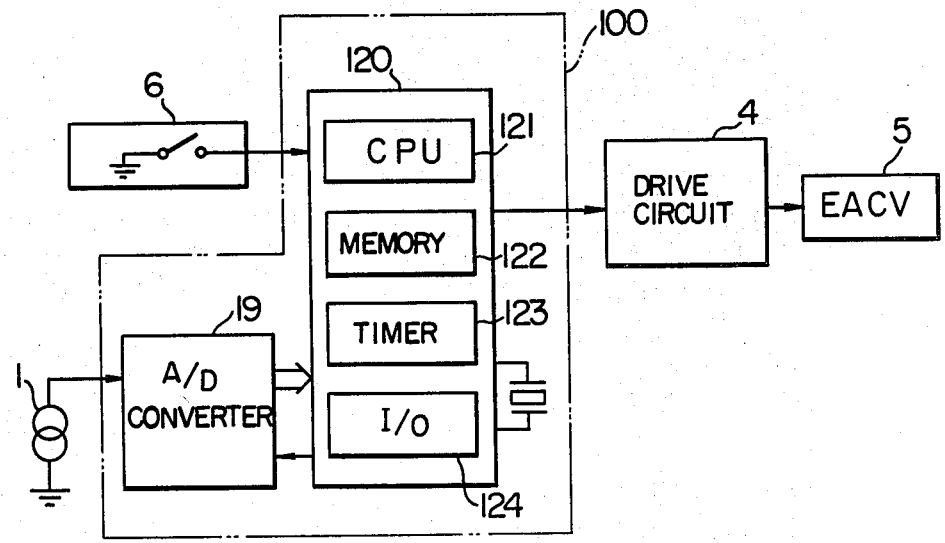
FIG. 4 is a diagram showing main blocks of a second embodiment of the present invention.
Figure 5:
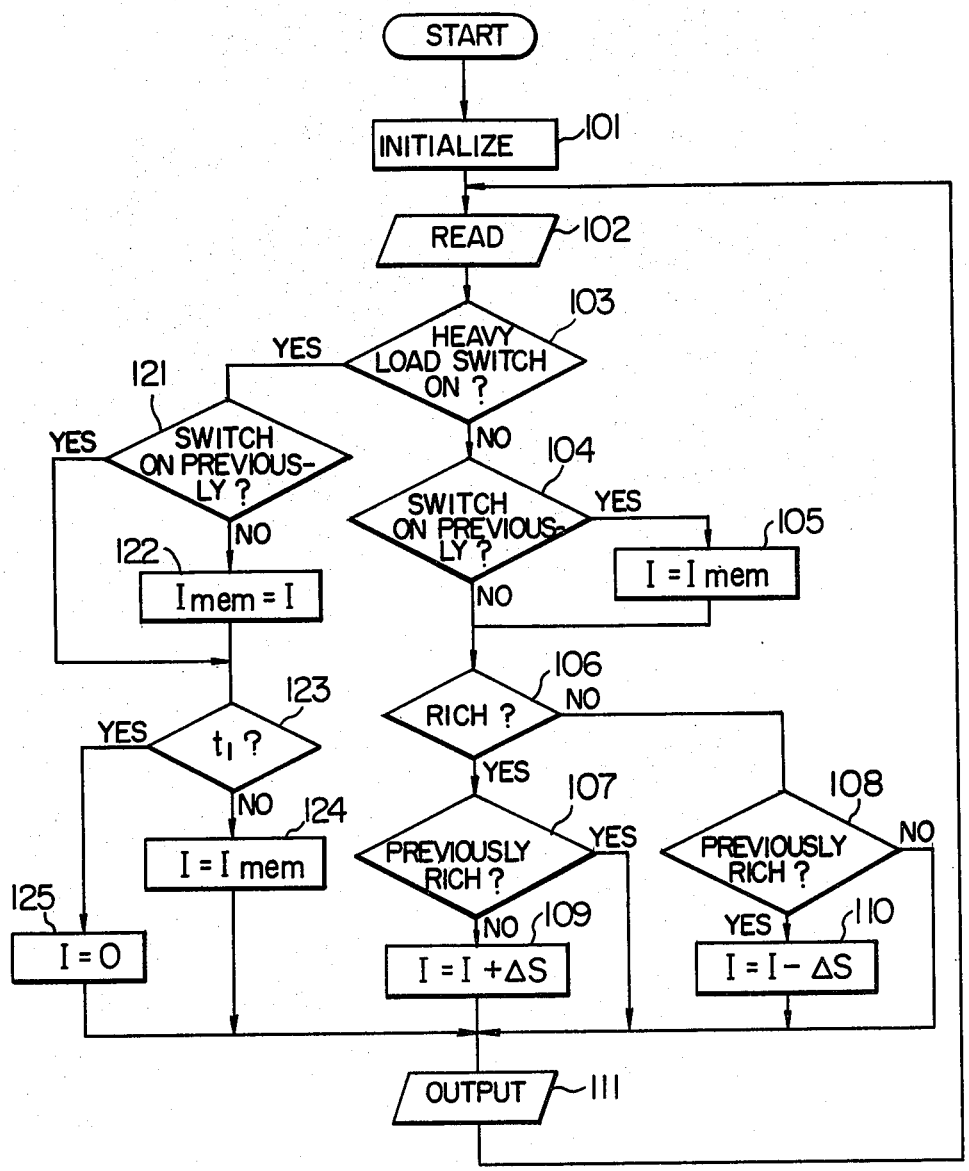
FIG. 5 is a flowchart showing the main routine to be executed by the microcomputer in FIG. 4.

A second embodiment using a microcomputer is shown in FIGS. 4 to 6. The microcomputer 120 is, for example, 68 series of Motorola or 80 Series of Intel and is well-known. It includes a CPU 121, a memory 122 having a ROM and a RAM, a timer 123, and an input-/output unit 124.

The microcomputer 120 produces a drive signal for controlling the EACV in response to the signal from the heavy load switch 6 and the oxygen sensor 1, which signal is applied to the drive circuit 41 and takes a digital form converted by the A/D converter 119. The A/D converter 119 and the microcomputer 120 make up an electronic control unit 100.

The microcomputer 120 operates according to the main routine of FIG. 5 and the 4-msec timer routine of FIG. 6. Specifically, the operation is started from the initialization step 101, followed by the step 102 for reading the output of the heavy load detection switch 6 and the A/D converted value of the oxygen sensor 1.

Step 103 decides whether or not the heavy load detection switch 6 is turned off, namely, whether a heavy load condition is involved or not, and if normal, the answer is "No", so that the process proceeds to the step 104. The step 105 decides whether or not the heavy load detection switch 6 is turned off in the previous program cycle, and if normal, the answer is "No" so that the process is passed to the step 106.

At step 106, it is decided whether or not the output value of the oxygen sensor 1 indicates the rich state of the air-fuel ratio, and when the answer is "Yes", the process proceeds to the next step 107, while if the answer is "No", the process is passed to the step 108. Steps 107 and 108 decide whether or not the output value of the sensor 1 indicates the rich condition in the previous program cycle and detects whether or not the signal of the sensor 1 has changed from lean to rich or rich to lean during the period from the previous program cycle to the present program cycle.

When the above-mentioned change has occurred, the step 109 or 110 adds or subtracts the skip value $\Delta S$ to or from the integration value I. If such a change has not occurred, on the other hand, the process proceeds directly to the step 111. At step 111, a drive signal corresponding to the integration value I is applied to the drive circuit 4, so that a program cycle is completed and the next program cycle is started from the step 102 again.

Under normal conditions, these processes are repeated, during which the timer interruption routine of FIG. 6 is started for digital integrating operation.

In this way, the integration value I is added or subtracted by ΔI for each 5 msec for substantial digital integration, and a signal based on the integration and skip (proportion) is produced at step 111 of the main routine.

When a heavy load condition is reached, step 103 decides "Yes", and step 121 detects whether or not the heavy load switch 6 is turned off also in the previous program cycle, that is, whether or not the heavy load condition is reached for the first time.

If the heavy load condition is reached for the first time, the integration value I of step 122 is stored in the variable Imem. Otherwise, the process is directly passed to the step 123. At step 123, it is decided whether or not the time $t_1$ has passed since the heavy load condition is reached. If the time $t_1$ has not yet passed, the integration value I is held at the memory value Imem at step 124.

If the time $t_1$ has passed, the process proceeds to step 125. At step 125, the integration value I is reduced to, say, zero for closing up the EACV5, followed by the step 111.

If the heavy load detection switch 6 changes from off to on state, the answer is "Yes" at step 104, so that the value I takes Imem at step 105, as stored at step 122.

We claim:

1. An air-fuel ratio control system for an engine, comprising:
   an oxygen sensor for detecting an air-fuel ratio of the engine;
   a heavy load detector for detecting a heavy load condition of the engine;
   an electric actuator for adjusting the air-fuel ratio; and
   an electronic control unit for applying a drive signal to said electric actuator in response to signals from said oxygen sensor and said heavy load detector;
   said electronic control unit including means, responsive to the signal of said oxygen sensor, for changing the value of an air-fuel ratio compensation signal, means, responsive to the signal of said heavy load detector, for detecting the lapse of a predetermined time beginning from the time when the heavy load condition is detected, means for holding the value of the air-fuel ratio compensation signal to a first predetermined value preceding the detection of the heavy load condition when the lapse of the predetermined time is not detected, and means for changing the value of the air-fuel ratio compensation signal to a second predetermined value to enrich the air-fuel ratio when the lapse of the predetermined time is detected.

2. A system according to claim 1, wherein said electronic control unit having further means including:
   a comparator circuit for comparing the detection signal produced from said oxygen sensor with a reference signal and producing an inverted comparison signal and a non-inverted comparison signal when said detection signal is larger than said reference signal,
   an integrator circuit for producing an air-fuel ratio compensation amount signal dependent on the concentration of the mixture in response to the inverted comparison signal and the non-inverted comparison signal produced from said comparator circuit,
   a hold circuit for producing a hold signal for maintaining the air-fuel ratio compensation amount output of said integrator circuit, regardless of the concentration of the mixture, in response to the detection signal of said heavy load detector,
   a timer circuit for producing a predetermined timing signal in response to the detection signal of said heavy load detector,
   a gate circuit for passing the air-fuel ratio compensation amount signal from said integrator circuit in response to said timing signal of said timer circuit, and
   a drive circuit for producing an air-fuel ratio control signal for controlling the air-fuel ratio of the mixture on the basis of the air-fuel ratio compensation amount signal passed through said gate circuit.

3. A system according to claim 1, wherein said electronic control unit includes:
   microcomputer means, performing program cycles, for receiving the detection signal from said oxygen sensor, and
   an A/D converter for converting the detection signal of said heavy load detector into a digital signal.

4. A system according to claim 3, wherein said microcomputer includes:
   means for deciding whether said heavy load detector is turned on,
   means for deciding whether said heavy load detector was turned on in a previous program cycle in accordance with the decision of said heavy load detector,
   means for deciding whether the oxygen concentration detected by said oxygen sensor is rich in accordance with the decision in said previous program cycle of said heavy load sensor,
   means for deciding whether the oxygen concentration detected by said oxygen sensor was rich in said previous program cycle in accordance with the decision of said oxygen sensor, and
   means for changing said air-fuel ratio compensation signal by a predetermined amount when the oxygen concentration in said previous program cycle is different from the oxygen concentration in the present program cycle.

* * * * *